US007784174B2

(12) United States Patent
Kanda et al.

(10) Patent No.: US 7,784,174 B2
(45) Date of Patent: Aug. 31, 2010

(54) METHOD OF MANUFACTURING INK JET PRINT HEAD

(75) Inventors: Toru Kanda, Oita (JP); Yuki Kozuka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/239,203

(22) Filed: Sep. 26, 2008

(65) Prior Publication Data

US 2009/0094833 A1 Apr. 16, 2009

(30) Foreign Application Priority Data

Oct. 2, 2007 (JP) ............................ 2007-258870

(51) Int. Cl.

| | |
|---|---|
| ***H05B 3/00*** | (2006.01) |
| ***B23P 17/00*** | (2006.01) |
| ***B21D 53/76*** | (2006.01) |
| ***B29C 65/00*** | (2006.01) |
| ***B32B 37/00*** | (2006.01) |
| ***B32B 38/04*** | (2006.01) |
| ***B41J 2/14*** | (2006.01) |
| ***B41J 2/16*** | (2006.01) |

(52) U.S. Cl. .................... 29/611; 29/890.1; 156/272.2; 156/275.5; 347/48

(58) Field of Classification Search .................. 29/611, 29/890.1; 347/48; 156/247, 272.2, 275.5, 156/307.7, 273.9, 297, 299, 300
See application file for complete search history.

(56) References Cited

U.S. PATENT DOCUMENTS 6,240,624 B1 * 6/2001 Hironaka .................... 29/611
6,652,702 B2 * 11/2003 Miyazaki et al. ......... 156/272.2
2007/0008378 A1 * 1/2007 Kanda ......................... 347/54
2007/0285465 A1 * 12/2007 Shibata et al. ................ 347/47
2008/0151007 A1 * 6/2008 Kozuka et al. ................ 347/62
2009/0094833 A1 * 4/2009 Kanda et al. ............... 29/890.1

FOREIGN PATENT DOCUMENTS

JP 2002-154209 5/2002
JP 2005-305960 11/2005

* cited by examiner

*Primary Examiner*—A. Dexter Tugbang
*Assistant Examiner*—David P Angwin
(74) *Attorney, Agent, or Firm*—Fitzpatrick, Cella, Harper & Scinto

(57) ABSTRACT

A method of manufacturing an ink jet print head allows an adhesive bonding a printing element substrate to a support member to be temporarily hardened efficiently and stably in a short time so as to achieve bonding with no air path or the like created at a bonding interface. Electrothermal transducing elements in the printing element substrate generate heat to temporarily harden the adhesive.

9 Claims, 17 Drawing Sheets

METHOD OF MANUFACTURING INK JET PRINT HEAD

BACKGROUND OF THE INVENTION

1. Field of the Invention

The present invention relates to a method of manufacturing an ink jet print head that ejects a print liquid such as ink through ejection ports for printing.

2. Description of the Related Art

An ink jet printing apparatus is based on what is called a non-impact printing scheme and characterized by making almost no noise during printing and being capable of printing various print media at a high speed. Thus, the ink jet printing apparatus is widely adopted to serve as a printing mechanism for a printer, a copier, a facsimile machine, and a word processor.

Typical ink ejecting schemes for a print head mounted in the ink jet printing apparatus use electromechanical transducers or irradiate ink with an electromagnetic wave such as laser so that the ink generates heat to allow ink droplets to be thermally ejected. Another known scheme uses electrothermal transducing elements that are heating resistors to heat the ink to cause film boiling, allowing the ink droplets to be ejected.

According to the scheme for the ink jet print head using the electrothermal transducing elements, the electrothermal transducing elements are provided in a print liquid chamber, and electric pulses that are print signals are applied to the elements, which thus generate heat to apply thermal energy to the ink. The scheme utilizes the pressure of air bubbles generated by a change in the phase of the ink when the electrothermal transducing elements generate heat, to eject the ink through fine ejection ports to print a print medium. The ink jet print head using the electrothermal transducing elements generally has ejection ports through which the ink droplets are ejected and ink channels through which the ink is fed to the ejection ports.

The ink jet print head includes a tank replaceable type in which ink tanks storing the ink and a print head section are removable and a type in which the print head section and the ink tanks are integrated together. In the type in which the print head section and the ink containers are integrated together, when the ink is exhausted, the ink jet print head as a whole is replaced with a new one. Thus, a user can always be provided with a new print head.

With reference to FIGS. 15A, 15B, and 16, a conventional common color ink jet print head 701 will be described which ejects yellow ink, magenta ink, and cyan ink for printing.

FIG. 15A is a perspective view of the conventional common color ink jet print head 701 clearly showing a bottom surface portion thereof. FIG. 15B is a perspective view of the conventional common color ink jet print head 701 clearly showing a top surface portion thereof. The ink jet print head 701 includes an ink jet print head section including a printing element substrate 1001, and an ink tank section containing ink; the ink jet print head section and the ink tank section are integrated together. The printing element substrate 1001 is composed of a substrate comprising wiring through which electric energy to be supplied to electrothermal transducing elements is transmitted, an ink supply port through which the ink is fed to the area in which the electrothermal transducing elements are arranged, and ink ejection ports through which the ink is ejected. The single printing element substrate 1001 comprises the ejection ports through which the three color inks, the yellow ink, the magenta ink, and the cyan ink, are ejected.

FIG. 16 is an exploded perspective view of a conventional ink jet print head. An electric wiring substrate 301 transmits electric signals to a printing element substrate 101, and inputs electric signals from the ink jet printing apparatus to the printing element substrate 101 via external signal input terminals 303. The electric wiring substrate 301 and the printing element substrate 101 are connected together by electrode terminals (not shown in the drawings) arranged on the printing element substrate 101 and flying leads 302 arranged on the electric wiring substrate 301. The connection section between the electric wiring substrate 301 and the printing element substrate 101 is covered with an electrode sealing compound 203 shown in FIG. 15A and thus protected from the ink.

The ink fed to the printing element substrate 101 is housed in an ink storage section (not shown in the drawings) enclosed by a support member 501 and a cover 503 (see FIG. 15B) to hold and store the color ink. An ink absorbent (not shown in the drawings) that holds the ink is housed in the ink storage section. A filter (not shown in the drawings) is provided in an ink supply channel 502 through which the ink is fed to a print head section provided inside the support member 501. The filter prevents foreign matter from entering ink ejection ports formed in the printing element substrate 101.

Common materials for the support member 501 include alumina and resin. However, in spite of the disadvantage of reducing the accuracy of a printing element substrate bonding surface of the support member 501, the resin advantageously allows the support member 501 to be manufactured more inexpensively than the alumina. A common adhesive used to bond the printing element substrate 101 and the electric wiring substrate 301 is of a thermosetting type that is easy to handle during a manufacturing process or of a hardening type using both light and heat.

In connection with a common process of manufacturing an ink jet print head 701, a method will be described below which bonds the printing element substrate 101 and the electric wiring substrate 301 to the support member 501.

First, in a bonding surface treatment step, a surface of the support member 501, to which the printing element substrate 101 and the electric wiring substrate 301 are bonded, is treated. Common surface treatments include plasma treatment and washing. Such a surface treatment allows improvement of the bonding strength exhibited when the substrate or the like is bonded to the support member subjected to the surface treatment.

Now, temporary hardening of an adhesive 201 will be described. In a step of bonding the printing element substrate 101, the adhesive 201 is coated on a recess portion 504 of the support member 501 to which the printing element substrate 101 is bonded. A printing element unit 401 made up of the printing element substrate 101 and the electric wiring substrate 301 is then applied to the recess portion 503. At this time, the position to which the printing element unit 401 is applied is adjusted by image processing or the like so that the printing element substrate 401 is applied at a predetermined accuracy. In the supplied printing element unit 401, the printing element substrate 101 and the electric wiring substrate 301 are already joined together. The adhesive 201 between the support member 501 and the printing element unit 401 has not been hardened yet. Thus, the printing element unit 401 moves and deviates from the predetermined application accuracy. Thus, in the apparatus to which the printing element unit 401 is applied, the adhesive 201 needs to be temporarily hardened so as to prevent the printing element unit 401 from being moved by vibration or the like during a transfer to the next step. Then, in the common manufacturing method, the adhesive 201 is fully hardened during a step following the temporary hardening.

Japanese Patent Laid-Open No. 2002-154209 discloses a method of hardening an adhesive sticking out from the outer periphery of the printing element substrate sucked and held by a vacuum finger by irradiating the adhesive with ultraviolet rays.

FIG. 17 shows a method of hardening an adhesive, described in Japanese Patent Laid-Open No. 2002-154209.

Furthermore, a method utilizing ultraviolet rays as a heat source irradiates the surface of the printing element substrate with ultraviolet rays 902 via an ultraviolet irradiation lens 901 to heat the printing element substrate to temporarily harden, via the printing element substrate, the adhesive that is in contact with the printing element.

Japanese Patent Laid-Open No. 2005-305960 discloses a method of forming an opening in the bonding surface of the printing element substrate and directly heating a back surface of the printing element substrate using an external heat source.

Such a method is used to accurately temporarily fix the printing element unit 401 to the support member via the adhesive. Then, in a full adhesive hardening step, the temporarily hardened adhesive 201, which bonds the printing element unit 401 to the support member, is fully hardened using a thermosetting furnace.

The adhesive is hardened using any of the above-described methods. Then, if the temporary hardening is performed by irradiating the adhesive sticking out from the outer periphery of the printing element substrate with ultraviolet rays, completing the temporary hardening of the adhesive requires about five seconds. If the temporary hardening is performed by irradiating the surface of the printing element substrate with the ultraviolet rays as a heat source, completing the temporary hardening of the adhesive requires about ten seconds.

According to the method disclosed in Japanese Patent Laid-Open No. 2002-154209, in connection with the configuration of the apparatus, the vacuum finger adhesively fixing the printing element substrate to the support member sucks and holds the printing element substrate to bond the printing element substrate to the adhesive coated on the support member. However, in this case, since the vacuum finger sucks and holds the printing element substrate, the vacuum finger covers most of the surface of the printing element substrate. Moreover, since a surface of the support member to which the printing element substrate is bonded is recessed, an ultraviolet irradiation area is narrowed by the vacuum finger covering most of the surface of the printing element substrate as well as the recess shape of the support member. This makes it difficult to irradiate the adhesive sticking out from the outer periphery of the printing element substrate with ultraviolet rays.

Thus, since the area that can be irradiated with ultraviolet rays is narrow, a reduced quantity of ultraviolet rays is applied to the adhesive. Consequently, the ultraviolet irradiation time needs to be increased in order to achieve hardening.

Even with the method utilizing ultraviolet rays as a heat source, since the vacuum finger exerts a suction force required to suck and hold the printing element substrate, the vacuum finger covers most of the surface of the printing element substrate. This reduces the area of the printing element substrate which can be irradiated with the ultraviolet rays. Furthermore, even though the surface of the printing element substrate is irradiated with the ultraviolet rays to heat the printing element substrate, heat escape to the vacuum finger sucking and holding the printing element substrate. This increases the time for which the printing element substrate is heated by ultraviolet irradiation, reducing production efficiency.

Furthermore, with the method of directly heating the back surface of the printing element substrate using the external heat source as described in Japanese Patent Laid-Open No. 2005-305960, the printing element substrate needs to have an area other than the ink supply port against which heaters abut to transmit heat. Thus, miniaturizing the printing element substrate is difficult, and this method is thus not preferable in terms of cost reduction. If the area via which heat is transmitted is reduced, a required quantity of heat is transmitted via the small abutting part, the printing element substrate locally and quickly becomes hot to temporarily harden the adhesive. As a result, the walls of the ink channels may be thermally deformed to mix the adjacent inks together.

Moreover, to temporarily harden the adhesive by raising the temperature of the printing element in a short time, the printing element substrate needs to be heated to a higher temperature than in the prior art. As a result, higher heat is transmitted to the electric wiring substrate 301 via electric wiring. The increased temperature of the electric wiring substrate promotes hardening of the adhesive bonding the electric wiring substrate to the support member. Then, in the subsequent step, even with an attempt to compressively bond the adhesive using a compressive bonding tool, the significantly hardened adhesive cannot be spread. This may affect the bonding plane accuracy of the electric wiring substrate 301. When an attempt is made to bond the electric wiring substrate to the support member with the adhesive prevented from being spread, air enters the interior of the adhesive to generate an air path at a bonding interface. During the subsequent step, a sealing compound used to seal the periphery of the electric wiring substrate enters the air path. Since the amount of sealing compound applied to the periphery is specified, the air path generated prevents the periphery of the printing element substrate and the electric wiring from being covered. Thus, the ink or the like may wet the printing element substrate or the electric wiring to degrade electrical quality.

SUMMARY OF THE INVENTION

An object of the present invention is to provide a method of manufacturing an ink jet print head which method allows an adhesive bonding a printing element substrate to a support member to be temporarily hardened efficiently and stably in a short time so as to achieve bonding with no air path or the like created at a bonding interface.

According to the present invention, a method of manufacturing an ink jet print head comprises a step of fixing a printing element substrate comprising an electrothermal transducing element to a support member using an adhesive, the method further comprising:

a step of driving the electrothermal transducing element to heat the printing element substrate to temporarily harden the adhesive.

The present invention includes the step of driving the electrothermal transducing element to heat the printing element substrate to temporarily harden the adhesive. The present invention can thus provide the method of manufacturing the ink jet print head which method allows the adhesive bonding the printing element substrate to the support member to be temporarily hardened efficiently and stably in a short time so as to achieve bonding with no air path or the like created at the bonding interface.

Further features of the present invention will become apparent from the following description of exemplary embodiments (with reference to the attached drawings).

DESCRIPTION OF THE EMBODIMENTS

First Embodiment

A first embodiment of the present invention will be described below with reference to the drawings.

Figure 1:
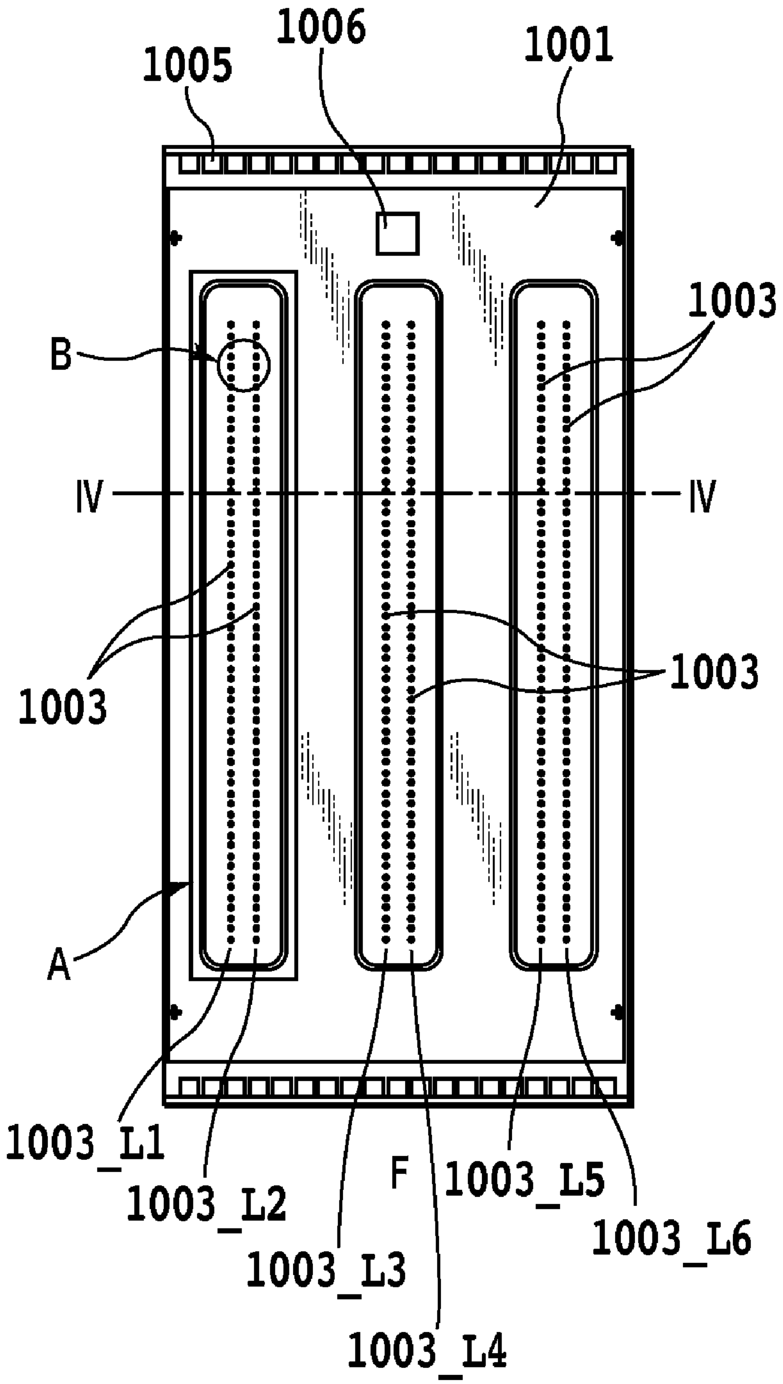
FIG. 1 is a diagram showing a front surface of a printing element substrate for use in a manufacturing method according to a first embodiment.
Figure 2:
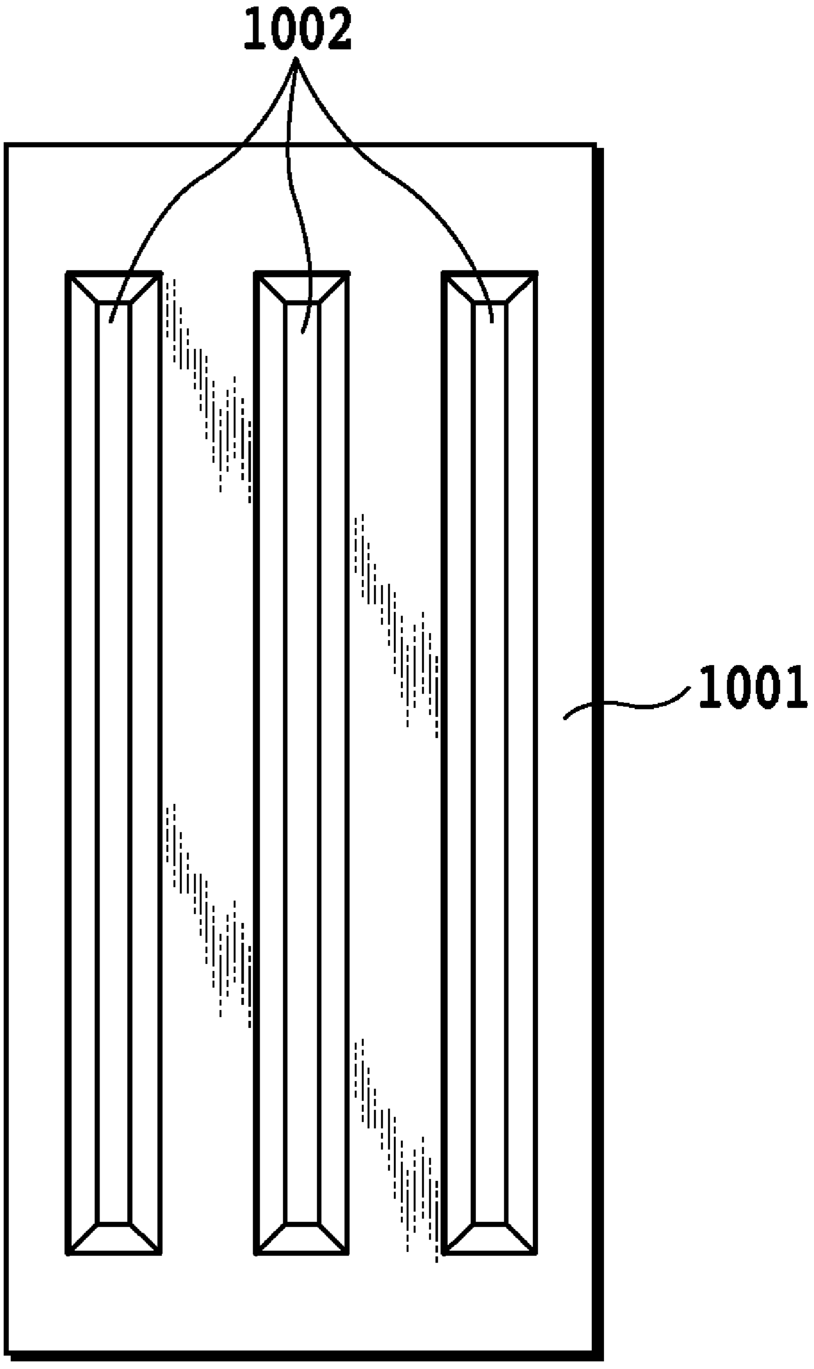
FIG. 2 is a diagram showing a back surface of the printing element substrate for use in the manufacturing method according to the first embodiment.

FIG. 1 is a diagram showing a front surface of a printing element substrate 1001 for use in a manufacturing method according to a first embodiment. FIG. 2 is a diagram showing a back surface of the printing element substrate 1001 for use in the manufacturing method according to the first embodiment. The printing element substrate 1001 has a plurality of electrothermal transducing elements (not shown in the drawings) that allow ink to be emitted to one surface of s substrate, and electric wiring (not shown) such as Al which is formed by a film forming technique. A plurality of ink channels (not shown in the drawings) and a plurality of ink ejection ports 1003 corresponding to the electrothermal transducing elements are formed by a photolithography technique. Ink supply ports 1002 through which ink is fed to the plurality of ink channels are formed to be open in the opposite surface (back surface).

Figure 3:
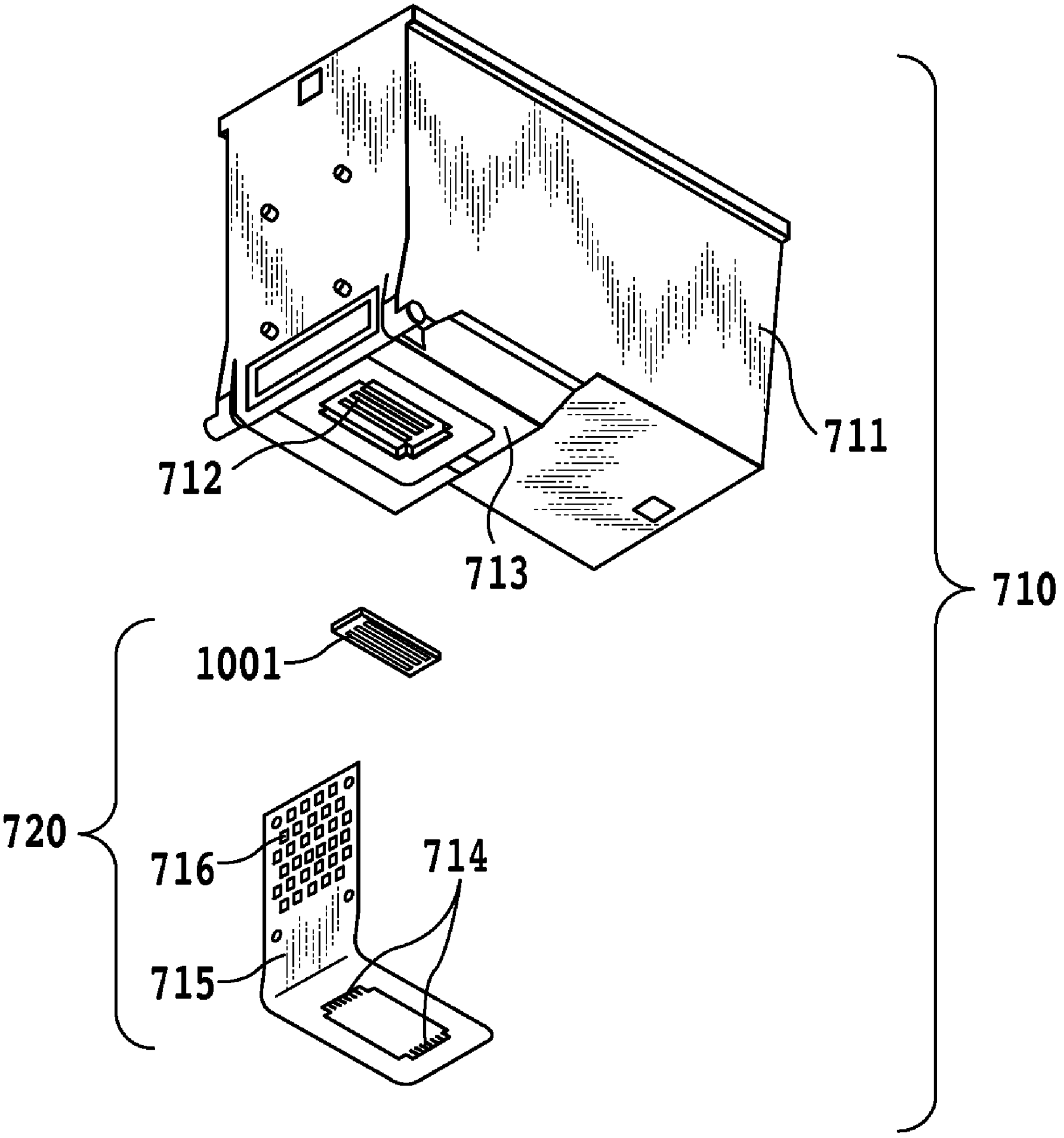
FIG. 3 is an exploded perspective view of an ink jet print head according to the present embodiment clearly showing the configuration thereof.

FIG. 3 is an exploded perspective view of an ink jet print head 710 according to the present embodiment clearly showing the configuration thereof. The configurations of the printing element substrate 1001, an electric wiring substrate, and a support member in FIG. 3 are similar to those in the prior art and thus the same as those shown in FIG. 14. However, these components have reference numerals different from those in the conventional example so as to be distinguished from the corresponding conventional components.

An electric wiring substrate 715 has flying leads 714 corresponding to electrodes on the printing element substrate 1001, and external signal input terminals 716 that receive electric signals. The external signal input terminals 716 are connected to the flying leads 714. According to the present embodiment, the support member 711 is formed by molding resin. A resin material used in the present embodiment contains 35% of glass filler in order to improve geometric rigidity.

Figure 4:
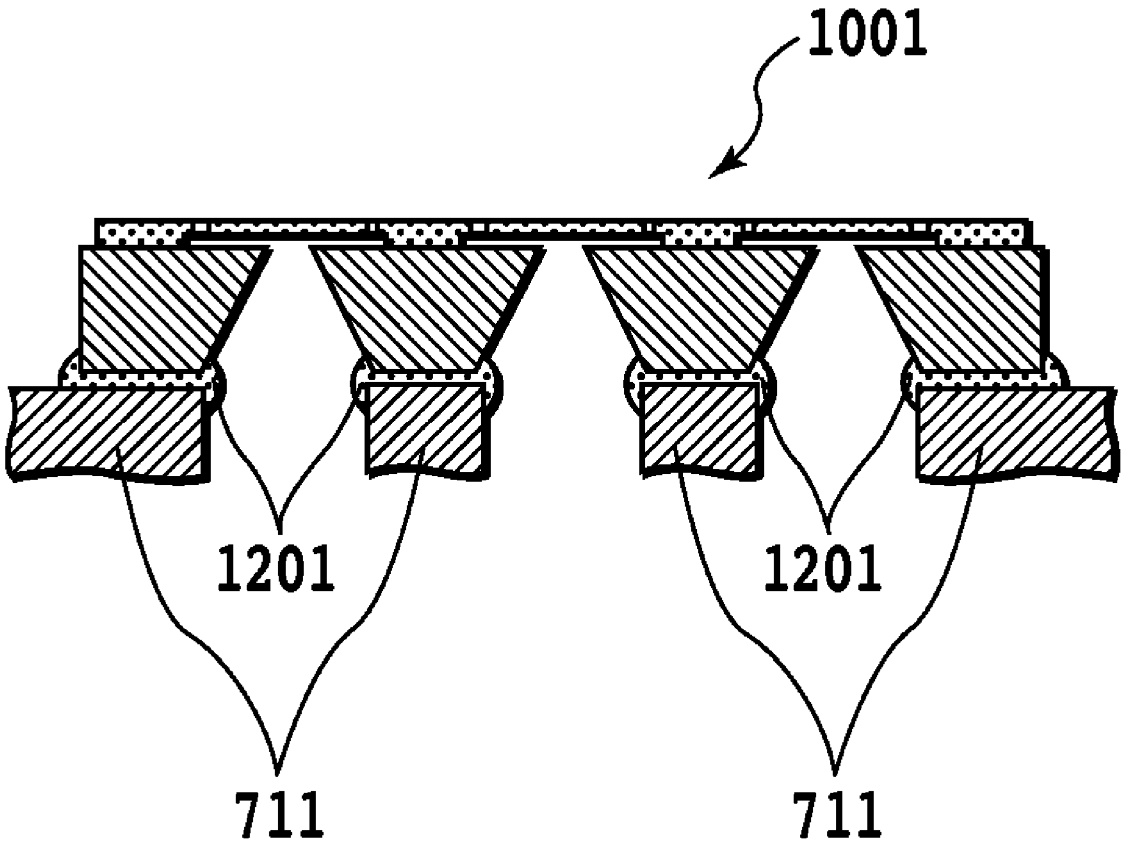
FIG. 4 is a sectional view of the configuration of a part of an ink jet print head that can be manufactured by the manufacturing method according to the first embodiment, wherein in this part, a printing element substrate is applied to a support member.

FIG. 4 is a sectional view of the configuration of a part of the ink jet print head 710 that can be manufactured by the manufacturing method according to the first embodiment, wherein in this part, the printing element substrate is applied to the support member. The printing element substrate 1001 is configured to be adhesively fixed to the support member 711 via the adhesive 1201. In the present embodiment, the adhesive 1201 is mainly composed of epoxy resin. With the adhesive 1201, the thickness of a bonding layer is set to about 80 μm taking the tolerance of the support member. The adhesive used in the manufacturing method according to the present embodiment is initially irradiated with ultraviolet rays and thus set to a hardenable condition. The adhesive is subsequently heated and thus hardened (temporarily hardened).

The present embodiment utilizes this characteristic of the adhesive. After the irradiation with ultraviolet rays, electric signals from electric signal input terminals provided in a printing element unit are applied to the electrothermal transducing elements, which then generate heat. The temperature of the printing element substrate 1001 as a whole thus rises to temporarily harden the adhesive.

Figure 5:
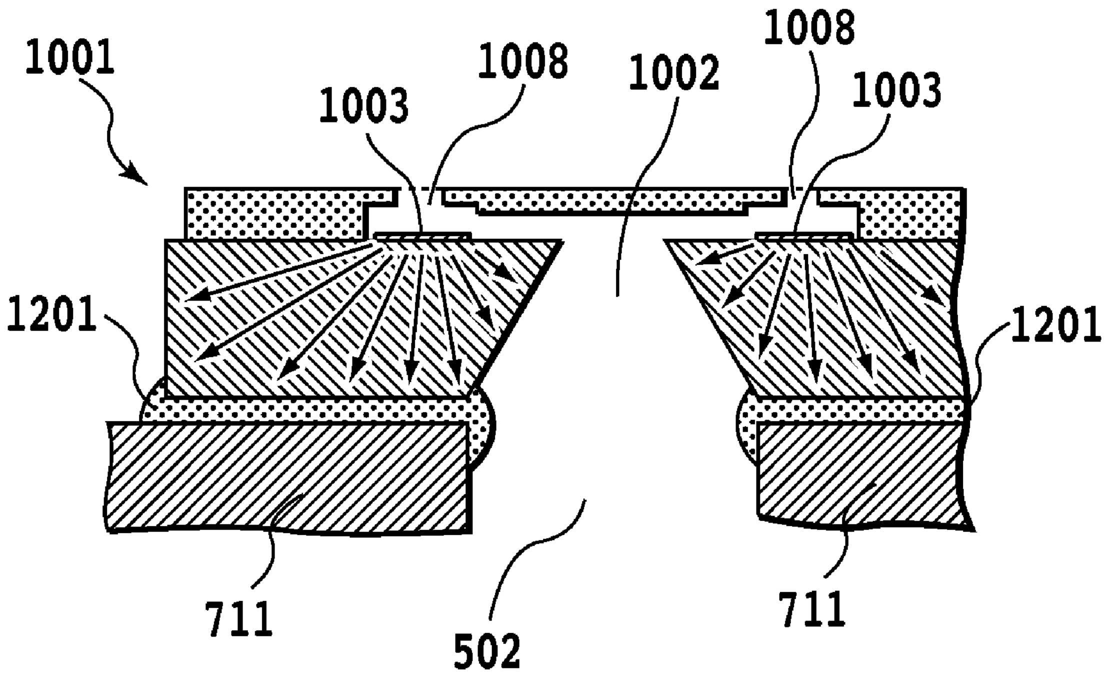
FIG. 5 is a partly enlarged sectional view of FIG. 4.

FIG. 5 is a partly enlarged sectional view of FIG. 4. The electrothermal transducing elements 1003 generate heat, which is transmitted through the printing element substrate to the back surface thereof. The heat reaching the back surface is utilized to harden the adhesive 1201.

A manufacturing process according to the present embodiment will be described below with reference to a flowchart.

Figure 6:
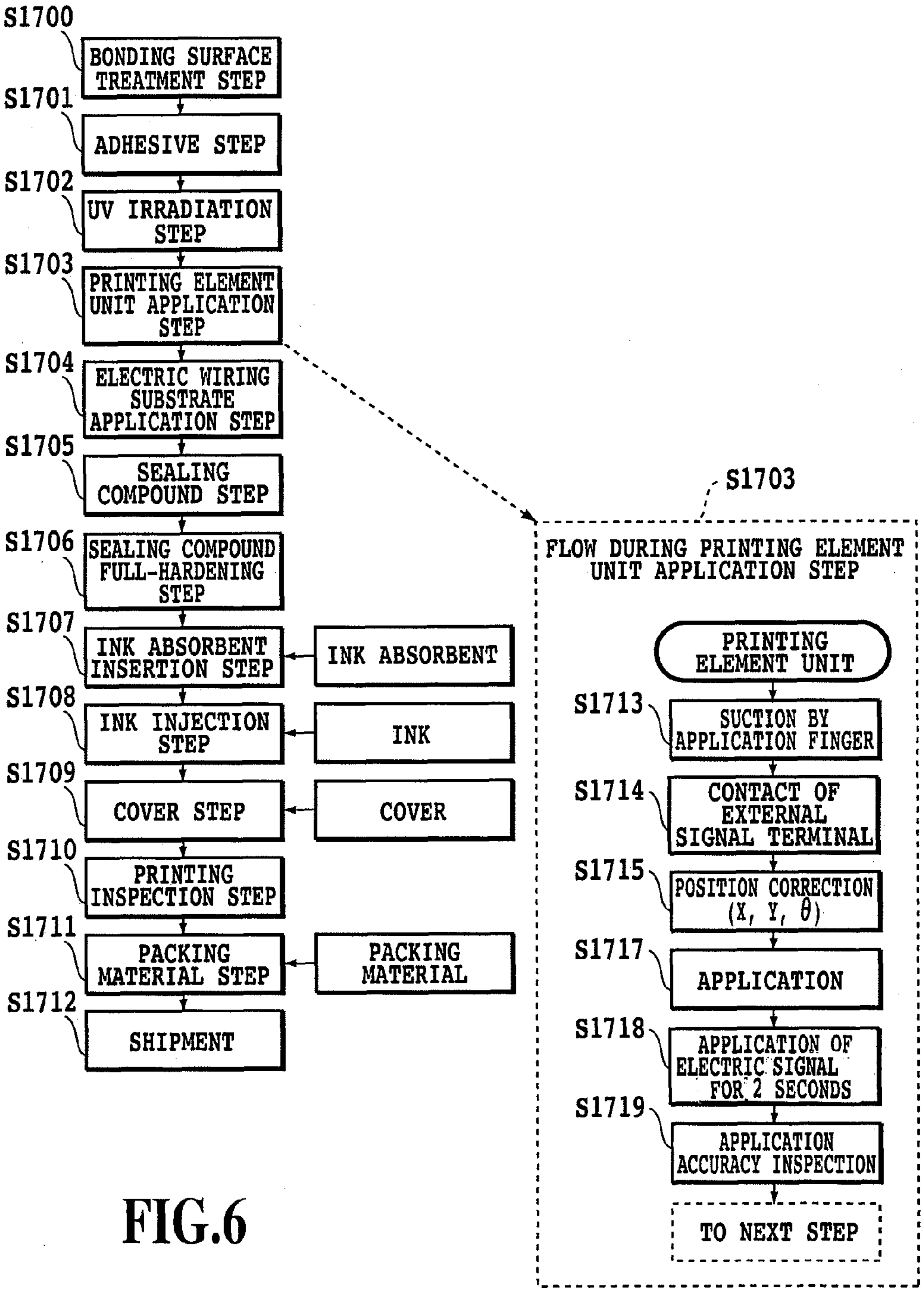
FIG. 6 is a flowchart showing a manufacturing process according to a first embodiment.

FIG. 6 is a flowchart showing a process from the beginning through the temporary hardening of the adhesive 1201, which is a characteristic part of the manufacturing method according to the present embodiment.

As shown in FIG. 6, in step S1701 following a bonding surface treatment operation in step S1700, the adhesive 1201 is coated on a recess portion 713 of the support member 711 to which the printing element substrate 1001 is to be bonded. Then, in an ultraviolet irradiation operation in step S1702, the applied adhesive 1201 is irradiated with a required amount of ultraviolet rays to generate cations. The cations generated make the adhesive 1201 hardenable. As described above, once the cations are generated, the adhesive 1201 used in the present embodiment can be thermally hardened.

In a printing element unit application step in the subsequent step S1703, the printing element unit is sucked by a vacuum finger (step S1713). Electric signal supply terminals (not shown in the drawings) are connected to the external signal input terminals for energization (step S1714). Subsequently, the position of the printing element unit is corrected (step S1715). The printing element unit is then applied to bonding surface (step S1717). The external signal input terminals are then energized and electric signals are applied to the electrothermal transducing elements 1003, provided on the printing element substrate 1001. The electrothermal transducing elements 1003 thus generate heat to temporarily harden the adhesive (step S1718). The time for which the electric signals need to be applied to the electrothermal transducing elements 1003 is two seconds, one second required to raise the temperature of the adhesive 1201 to a value required to temporarily harden the adhesive 1201 and one second required to maintain the temperature required for the temporary hardening. This is significantly shorter than the time conventionally required for the temporary hardening.

A method of controlling heating of the electrothermal transducing elements according to the present embodiment will be described below.

Figure 7:
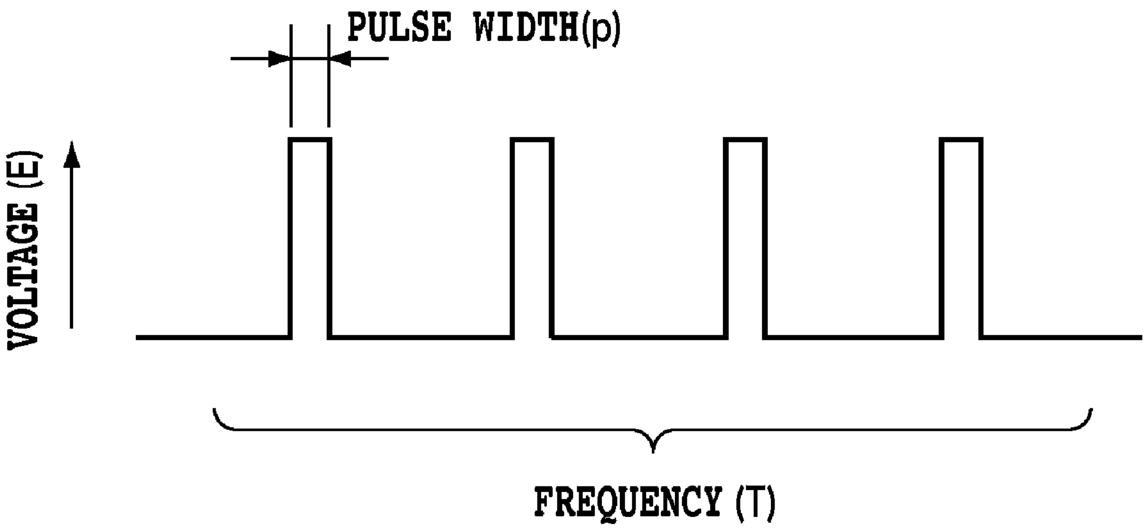
FIG. 7 is a diagram showing the parameter of electric energy applied to electrothermal transducing elements.

FIG. 7 is a diagram showing parameters for electric energy applied to the electrothermal transducing elements. Electric energy is applied to the electrothermal transducing element 1003 in order to heat the printing element substrate. Parameters for the electric energy include an applied voltage (E), a pulse width (p), the period (T) of the pulse, and a method of selectively driving the electrothermal transducing elements 1003. The condition of the electrothermal transducing elements 1003 varies depending on the printing element substrate 1001 owing to a possible variation in film thickness or the like during the manufacturing process. Thus, application of excess electric energy may damage the electrothermal transducing elements 1003, which may be broken. The electrothermal transducing elements 1003 thus need to be used under optimum conditions.

If low energy is applied to the electrothermal transducing elements 1003, a long time is assumed to be required for the printing element substrate 1001 to reach the temperature required to harden the adhesive 1201. If applied energy is low, the temperature of the printing element substrate may fail to reach the value required to temporarily harden the adhesive, thus failing to achieve the temporary hardening.

Figure 8:
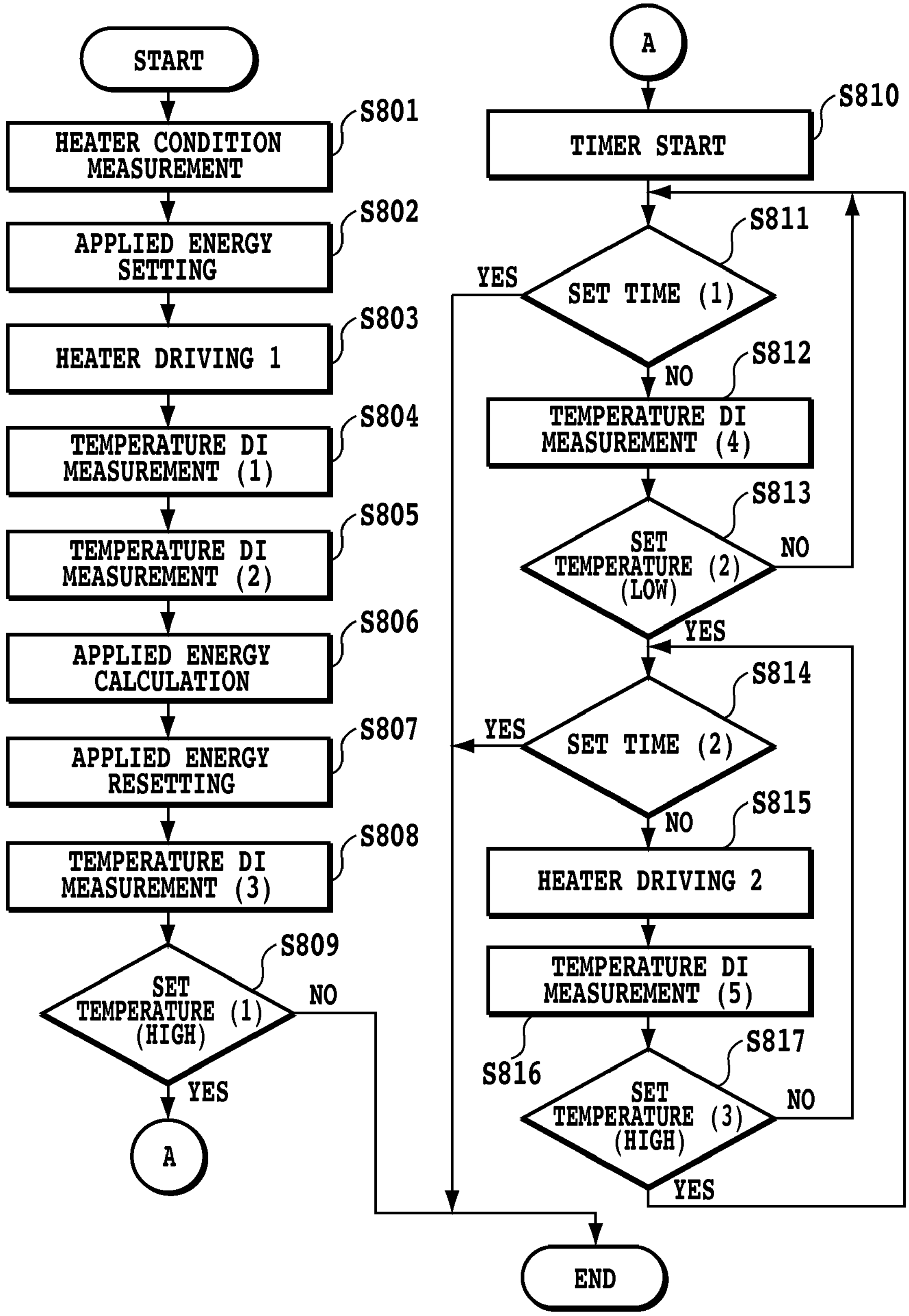
FIG. 8 is a flowchart showing a method of controlling electrothermal transducing elements in the manufacturing method according to the first embodiment.

FIG. 8 is a flowchart showing a method of controlling the electrothermal transducing elements (hereinafter also referred to as heaters) in the manufacturing method according to the present embodiment. When a signal for start of control of the electrothermal transducing elements 1003 is received, a sequence in FIG. 8 is started. Once the sequence is started, in a heater condition measurement in step S801, the electric resistance value of each of the electrothermal transducing elements is measured. The electric energy parameters are then set to the best values using an electric resistance value-electric energy conversion table (not shown in the drawings). The set electric energy parameters enable correction of a difference in temperature increase caused by a dimensional error or the like in each of the electrothermal transducing elements. In the present embodiment, the applied voltage is set to 20.0 to 26.0 V, the pulse width is set to 0.90 to 1.21 μsec., and the driving frequency is set to 10 to 20 kHz. Subsequently, in applied energy setting in step S802, the values set in step S801 are set in an internal memory in the manufactured apparatus.

However, even with the dimensional error in each of the electrothermal transducing elements taken into account, the temperature increase may vary depending on the thickness of the printing element substrate or the like. Thus, the heaters need to be actually driven, checked for the temperature increase, and corrected as required.

In heater driving 1 in step S803, electric energy is applied to the electrothermal transducing elements 1003 to generate thermal energy. In the present embodiment, the temperature of the printing element substrate 1001 is intended to reach at least 100° C. one second later. In temperature Di measurement (1) in step S804, the temperature of the printing element substrate 1001 heated by the thermal energy generated in the heater driving 1 in step S803 is read from an output value from a temperature measurement element 1006 (see FIG. 1) installed in the printing element substrate 1001.

The temperature measurement element 1006 is characterized in that when a constant voltage of 200 μA is applied between an anode and a cathode, the element 1006 exhibits a VF value of 0.625 V and a temperature-voltage change amount (∠VF/∠T) of −2.100 mV/° C. in a 25° C. environment.

Figure 9:
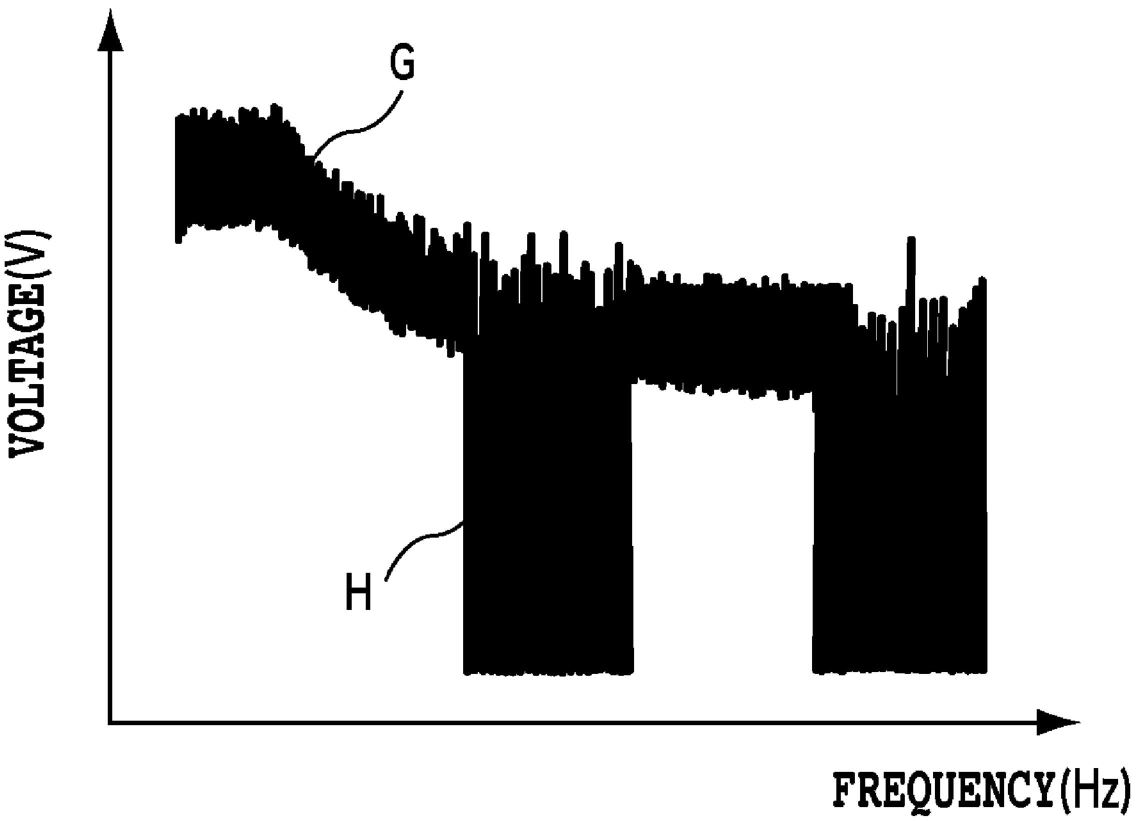
FIG. 9 is a graph showing an output voltage from a temperature measuring element.

FIG. 9 is a graph showing an output voltage from the temperature measurement element 1006. When the temperature measurement element 1006 is used to measure the temperature of the printing element substrate 1001 with the electrothermal transducing elements 1003 driven, noise H may be generated in the output voltage from the temperature measurement element 1006 as shown at G in FIG. 9. The results of the present inventors' examinations indicate that the noise H is caused by driving of the electrothermal transducing elements 1003. The results also indicate that the noise H occurs more significantly at a driving frequency of more than 1 kHz.

Thus, to avoid the possible noise, the following operation is performed in the temperature Di measurement (1): the electrothermal transducing elements 1003 are stopped before the temperature of the printing element substrate 1001 is measured using the temperature measurement element 1006. The present embodiment sets a wait time of 4 msec that starts when driving is stopped. Once the wait time ends, measurement of the temperature of the printing element substrate 1001 is started. This enables the temperature to be measured with possible noise in the output value prevented. Furthermore, according to the present embodiment, measurement timing is such that the temperature of the printing element substrate 1001 is measured 50 msec after the start of driving of the heaters in the heater driving 1.

Then, in temperature Di measurement (2) in step S805, the temperature of the printing element substrate 1001 is measured as is the case with temperature Di measurement (1). However, according to the present embodiment, the measurement timing in this case is such that the temperature of the printing element substrate 1001 is measured 100 msec after the start of driving of the heaters in the heater driving 1. In this manner, the temperature increase is checked at two different points in time.

Once Di temperature measurement (2) is completed, the sequence shifts to applied energy calculation in step S806 to calculate a change in temperature increase (∠T) on the basis of the temperature of the printing element substrate 1001 measured in the temperature Di measurement (2) in step S805 and the calculated value of the applied energy.

The temperature measured value and measurement timing in the temperature Di measurement (1) in step S804 are defined as T1 and P1, respectively. The temperature measured value and measurement timing in the temperature Di measurement (2) in step S805 are defined as T2 and P2, respectively. The temperature increase change (∠T) is derived on the basis of a calculation formula (∠T)=(T2−T1)/(P2−P1). Then, on the basis of the calculated temperature increase change (∠T), the electric energy parameters (applied voltage, pulse width, and driving frequency) are determined which allow the temperature to reach the value required to harden the adhesive, within a set time. In the present embodiment, to meet the conditions required to temporarily harden the adhesive, 100° C. and 1 sec, the target temperature is set to 110° C., and the set time is 1 second.

In connection with temperature control, the temperature of the printing element substrate 1001 is measured at every certain timing while the heaters are being driven. As described above, possible noise prevents measurements from being achieved using the temperature measurement element 1006 with the heaters being driven. When the driving is paused a number of times so that temperature can be measured while the driving is stopped, the temperature increase change (∠T) is affected by the total of the wait time lasting until the output from the temperature measurement element 1006 is stabilized and the measurement time. This is why the present embodiment adopts the sequence of calculating the temperature increase change (∠T) on the basis of the temperatures measured at the two points in time and controlling the energy applied to the electrothermal transducing elements 1003 on the basis of the calculation result.

Then, in applied energy resetting in step S807, the electric energy parameters determined in the applied energy calculation in step S806 are set in the memory in the manufactured apparatus. The heaters are then driven. Subsequently, in temperature Di measurement (3) in step S808, the temperature of the printing element substrate 1001 read from the temperature measurement element 1006 is measured. The measurement timing in this case is such that the temperature is measured a set time (1 sec) after the start of driving. Then, in set temperature (1) in step S809, the measured temperature is compared with a preset temperature (1) (high) (in the present embodiment, 110° C.). If the measured temperature is equal to or higher than the set temperature (1) (high), the sequence proceeds to (Yes) and shifts to the next step. If the measured temperature is lower than the set temperature, the sequence proceeds to (No) and ends. In this case, the sequence may return to the heater driving 1 in step S803 to perform heating and then reads the temperature to determine whether or not the measured temperature is equal to or higher than the set temperature.

In the present embodiment, the set temperature (1) (high) is set to 110° C. However, the value of the set temperature (1) (high) is preferably varied depending on the hardening temperature characteristic of the adhesive used.

Now, control will be described which is performed such that the thermal energy used to heat the printing element substrate 1001 is maintained for a specified time in order to meet the conditions required to temporarily heat the adhesive 1201, that is, at least 100° C. and 1 sec.

First, in timer start in step S810, an electric energy application time setting timer is started. In the present embodiment, the time is set to 1 sec.

In set time (1) (step S811), the apparatus checks whether or not the time counter has reached the set value. If the time counter has not reached the set time (1 sec) (No), the sequence proceeds to the next step, temperature Di measurement (4) (step S812). The temperature of the printing element substrate 1001 is thus read from the temperature measurement element 1006, installed on the printing element substrate 1001. If the time counter has reached the set time (1 sec) (Yes), the sequence is completed.

After the measurement in temperature Di measurement (4) (step S812), in set temperature (2) (step S813), the temperature of the printing element substrate 1001 is compared with a set target temperature (low). Here, the set temperature (low) is the set value of the lower limit temperature required to maintain the thermal energy quantity (printing element substrate temperature) constant. In the present embodiment, the value of the set temperature is 105° C. With possible overshoot assumed, the lower limit value is set such that the hardening conditions, that is, 100° C. and 1 sec, are met. If the temperature of the printing element substrate 1001 measured in temperature Di measurement (4) is lower than the set temperature (low), the sequence returns to the set time (1) in step S811 to repeat the steps S811 to S813 until the comparison condition for the set time (1) or the set temperature (2) (low) is met. In step S813, if the temperature of the printing element substrate 1001 is equal to or higher than the set temperature (low), the sequence proceeds to set time (2) in the next step S814.

In set time (2) (step S814), the apparatus determines whether or not the timer count value has reached the timer set time (1 sec). If the timer count value has failed to reach the timer set time (Yes), the sequence proceeds to heater driving 2 in the next step S815. If the set timer count value has reached the timer set time (1 sec), the sequence is completed. In the heater driving 2 in step S815, electric energy is applied to maintain the thermal energy quantity constant (printing element substrate temperature). The electric energy applied in this case is provided in order to maintain the temperature. Thus, compared to the control in the heater driving 1, which heats the printing element substrate 1001 to the adhesive hardening temperature, the control in this case maintains the thermal energy quantity constant with the applied electric energy quantity reduced. This control is calculated on the basis of the data on the applied energy setting in step S802 and on the applied energy resetting in step S807.

In temperature Di measurement (5) (step S816), the temperature of the printing element substrate 1001 is read from the temperature measurement element 1006, installed on the printing element substrate 1001. In the next set temperature (3) (step S817), the read temperature is compared with the set temperature (high). The set temperature (high) is the set value of the upper limit temperature which is required to maintain the thermal energy quantity constant. In the present embodiment, the set value is 110° C. If the result of the comparison in this step shows that the set temperature (high) has been reached, the sequence returns to the set time (1) to repeat the control steps. If the value from the temperature measurement element 1006 has failed to reach the set temperature (3) (high), the sequence returns to the set time (2) (step S814) to repeat the steps S814 to S817 until the set temperature (high) is reached.

This control enables the temperature of the printing element substrate 1001 heated by the electrothermal transducing elements 1003 to vary in a temperature curve along which the adhesive 1201 can be temporarily hardened.

Figure 10:
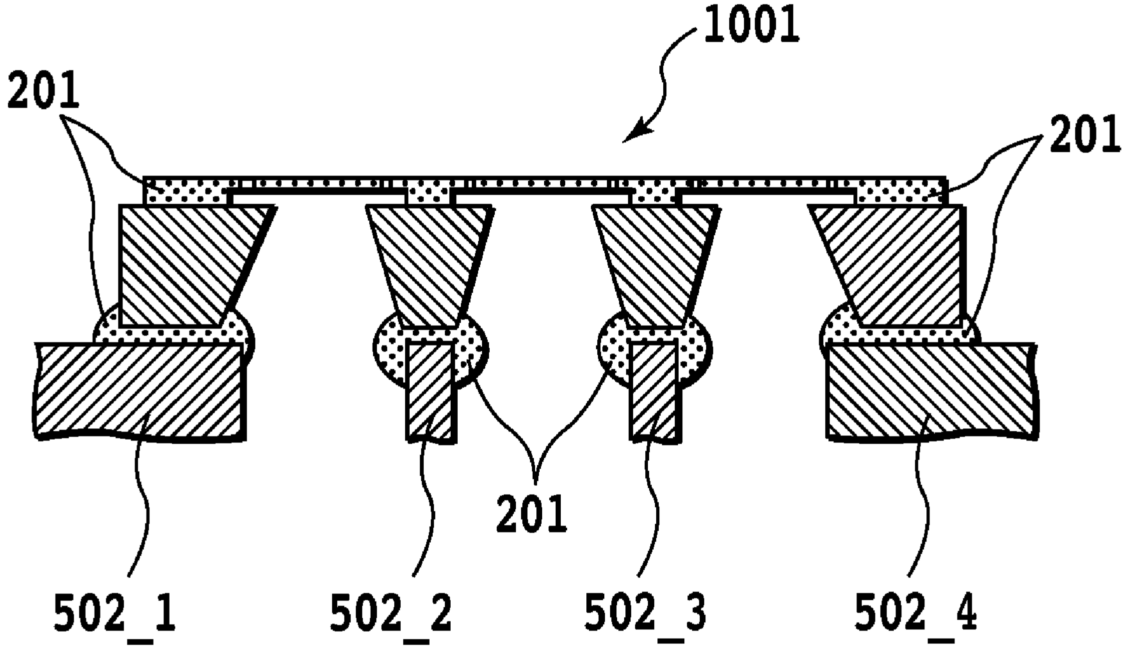
FIG. 10 is a diagram showing a miniaturized printing element substrate and a miniaturized support member which are connected together by an adhesive.

FIG. 10 is a diagram showing that the miniaturized printing element substrate 1001 and the miniaturized support member 711 are connected together by the adhesive 1201. The printing element substrate 1001 is desirably as small as possible because a size reduction increases the number of printing element substrates that can be obtained from a wafer during manufacture, reducing manufacturing costs.

If the size of the printing element substrate 1001 is reduced, then in an ink jet print head configured to eject a plurality of inks as in the case of the present embodiment, the width of ink supply port walls 502_2 and 502_3 needs to be reduced so as to allow the inks to be fed to the printing element substrate 1001 without being mixed together. In the present embodiment, the width dimension of the printing element substrate 1001 is reduced from 4.32 [mm], a conventional value, to 2.6 [mm]. The width of the ink supply port walls 502_2 and 502_3 is correspondingly reduced from 0.7 [mm], a conventional value, to 0.4 [mm].

The thinned ink supply port walls 502_2 and 502_3 may be thermally deformed when the temperature is raised to harden the adhesive 1201 in a short time (in the present embodiment, 120° C./1 sec). This is because with the inner ink supply port walls 502_2 and 502_3, which are narrower than outer ink supply port walls 502_1 to 502_4, heat generated by the printing element substrate 1001 is accumulated instead of escaping to the support member 711.

When the ink supply port walls 502_2 and 502_3 are deformed, a space is created at the interface between the adhesive 201 and the ink supply port walls 502_2 and 502_3. As a result, the adjacent inks may be mixed together.

Thus, in the present embodiment, any of lines (1003-L1 to L6) of the plurality of electrothermal transducing elements 1003, provided in the printing element substrate 1001, can be optionally selected so that the electrothermal transducing elements in the selected line generate heat energy, as shown in FIG. 1. The present embodiment takes advantage of this characteristic to perform control such that the printing element substrate 1001 and the support member 711 are bonded together. The control is such that the electrothermal transducing element lines 1003_L1 and 1003_L6 on the ink supply port walls 502_1 and 502_4, which may be thick, are driven without driving the electrothermal transducing element lines 1003_L2 to 1003_L5 on the ink supply port walls 502_2 and 502_3. That is, the present method bonds the printing element substrate 1001 to the support member 711 by driving only the outermost electrothermal transducing element lines on the printing element substrate 1001.

Figure 11:
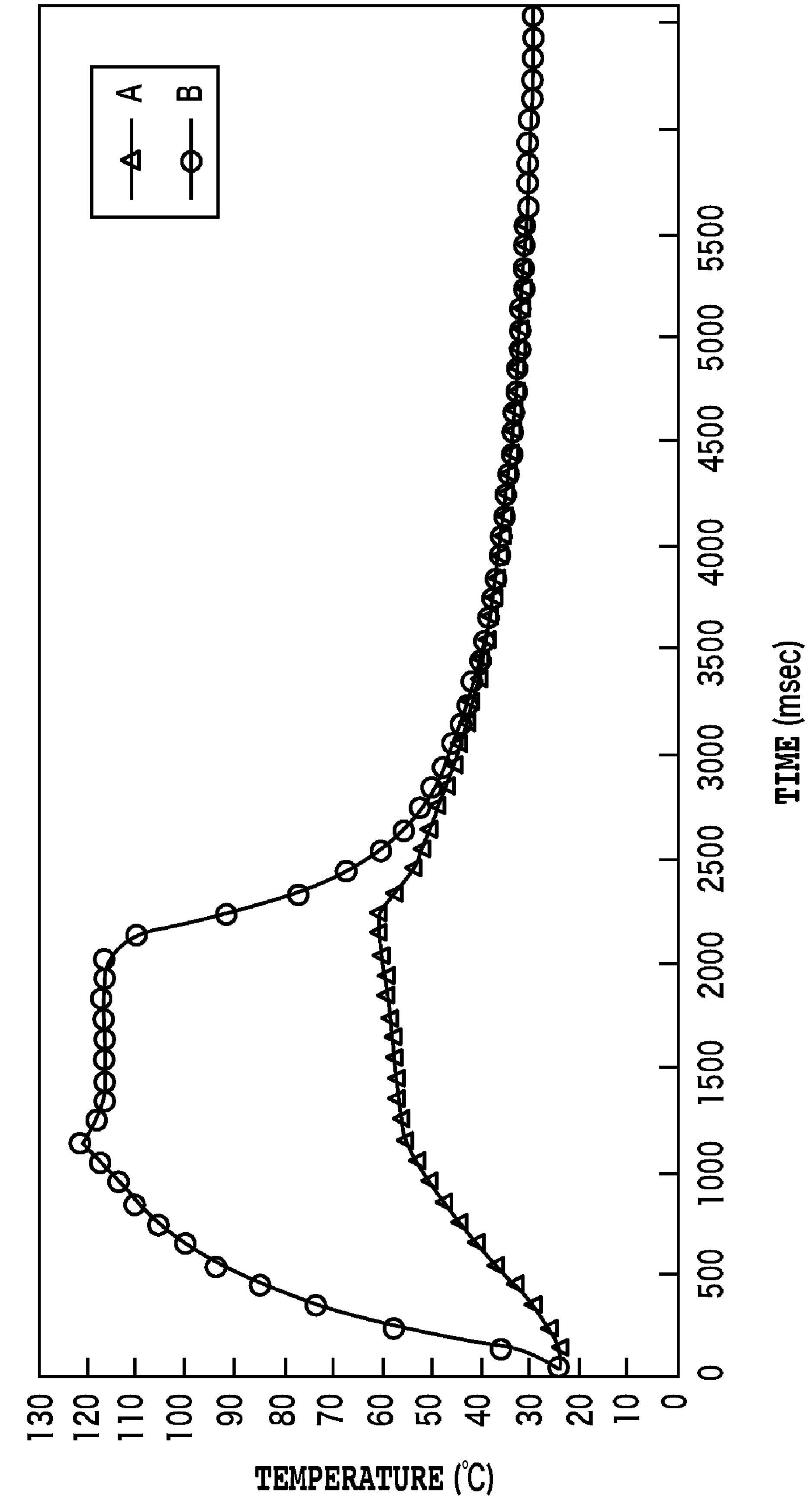
FIG. 11 is a diagram showing the temperature of a back surface of the printing element substrate in connection with the manufacturing method according to the first embodiment.

FIG. 11 is a diagram showing the temperature of the back surface of the printing element substrate 1001 in connection with the manufacturing method according to the first embodiment. A line A shows the temperature of the ink supply port wall 502_1. A line B shows the temperature of the ink supply port wall 502_2. The results in FIG. 10 indicate that the thermal energy control according to the present embodiment allows the ink supply port wall 502_1 to be temporarily hardened (temporary hardening condition: at least 100° C., 1 sec). Thus, the present embodiment temporarily hardens the adhesive bonding the thick ink supply port walls 502_1 and 502_4 to the support member 711 without temporarily hardening the adhesive bonding the narrowed ink supply port walls 502_2 and 502_3 to the support member 711. This allows the printing element substrate 1001 to be temporarily fixed to the support member 711 without heating the ink supply port walls 502_2 and 502_3, which may be deformed by rapid heating.

FIG. 6 will be referenced again. The operations following a printing element unit application operation and including a full hardening operation, that is, an electric wiring substrate application operation step S1704 to a cover operation step S1709, are similar to the corresponding steps in the prior art, and will thus not be described below. The above-described operations complete the ink jet print head 710.

As described above, the present embodiment avoids utilizing ultraviolet irradiation and an external heat source during the printing element unit application operation and allows the electrothermal transducing elements on the printing element substrate to generate heat on a line basis. The adhesive that is in contact with the printing element substrate can thus be temporarily fixed. Consequently, the method of manufacturing the ink jet print head can be provided which allows the adhesive to be temporarily hardened efficiently and stably in a short time.

When the temperature of the printing element substrate was raised in a short time according to the manufacturing method according to the present embodiment, the ink channel walls were prevented from being thermally deformed and no air path was created at the interface.

Second Embodiment

A second embodiment of the present invent will be described with reference to the drawings. The second embodiment is similar to the first embodiment in that the electrothermal transducing elements on the printing element substrate generate heat without relying on an external heat source. Thus, the description of components similar to those in the first embodiment is omitted. Only the characteristic aspects of the present embodiment will be described.

Figure 12:
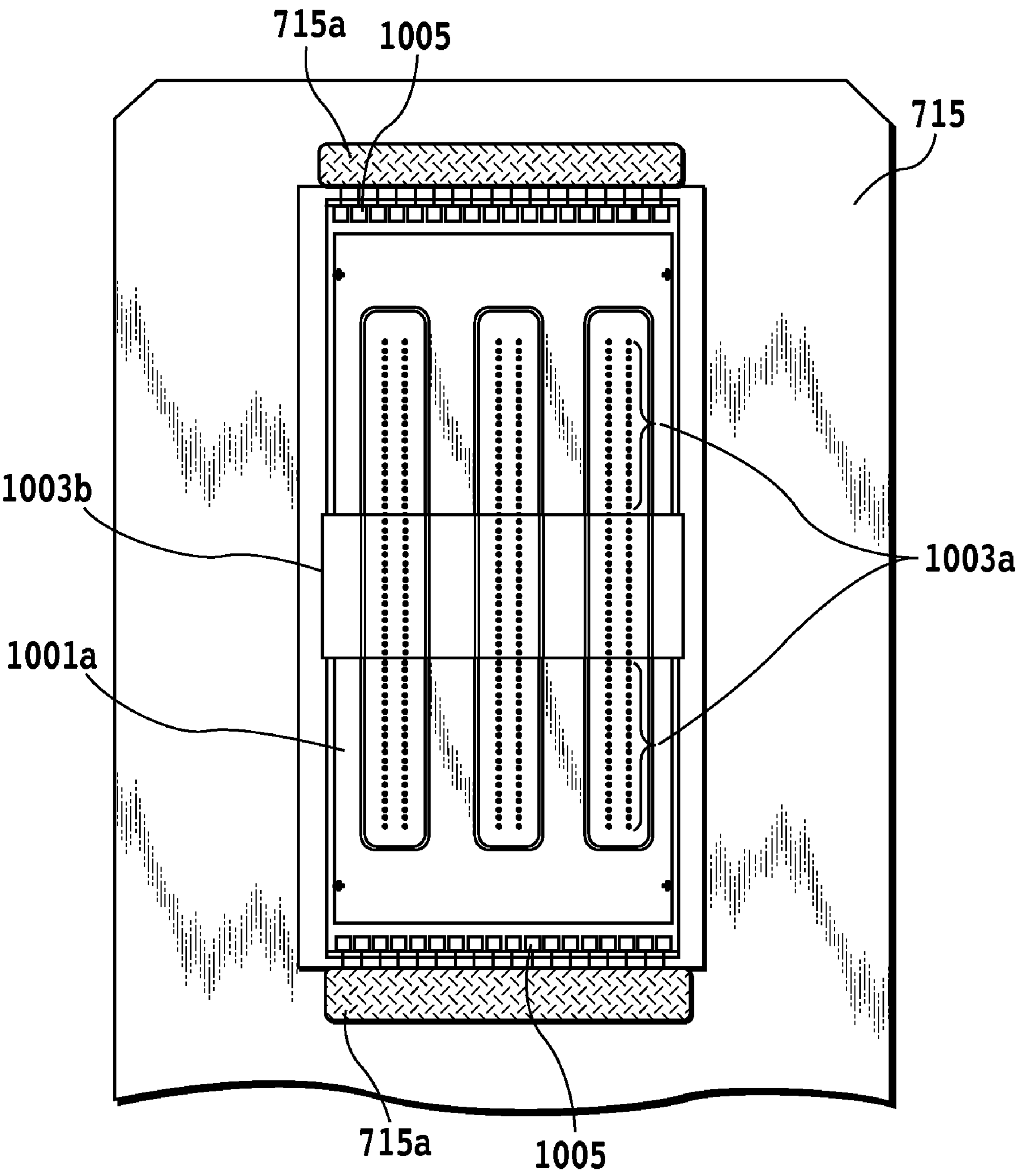
FIG. 12 is a diagram showing that the printing element substrate is bonded to an electric wiring board in order to describe a manufacturing method according to a second embodiment.

FIG. 12 is a diagram showing that the printing element substrate and the electric wiring board are bonded together, in order to describe the manufacturing method according to the present embodiment. The printing element substrate 1001 is connected to the electric wiring substrate 715 by bonding the flying leads 714, formed on the electric wiring substrate 715 to electrode terminals 1005 provided on the printing element substrate 1001. Thus, when the printing element substrate 1001 is bonded to the support member 711 by the adhesive 1201, the electric wiring substrate 715 abuts against the support member 711. Since the electric wiring substrate 715 and the support member 711 are also bonded together, the adhesive 1201 is coated on areas of the support member 711 against which the electric wiring substrate 715 abuts.

In such a configuration, when the electrothermal transducing elements 1003 are driven to harden the adhesive 1201, thermal energy may be transmitted from the electrode terminals 1005 through the flying leads 714 to promote the adhesive coated on a bottom surface of the electric wiring board 715*a*.

The ink jet print head 710 is installed in the printing apparatus via a top surface of the electric wiring substrate 715, and a cleaning cap provided in a cleaning unit cleaning ink supply ports 1008 and the like abuts against the top surface of the electric wiring board 715. Thus, when the electric wiring substrate 715 is bonded and if the support member 711 and the electric wiring board 715 are bonded together without defining a position in a height direction, the planarity of the top surface of the electric wiring substrate 715 cannot be maintained. As a result, when the ink jet print head 710 is cleaned in the printing apparatus, the cleaning cap and the electric wiring substrate 715 fail to tightly contact each other, making the correct cleaning difficult.

When the electric wiring board 715 and the support member 711 are bonded together by a conventional heating method using a heating tool, with hardening of the adhesive 1201 bonding the electric wiring substrate 715, promoted, the adhesive may fail to spread, thus creating an air path. Once the air path is created, after the coating of a peripheral sealing compound in a subsequent step, the peripheral sealing compound may enter the air path. Thus, the peripheral sealing compound may fail to cover the ends of the printing element substrate 1001 and the flying leads 714. Then, ink may wet the ends or the flying leads, disadvantageously affecting electrical quality.

Figure 13:
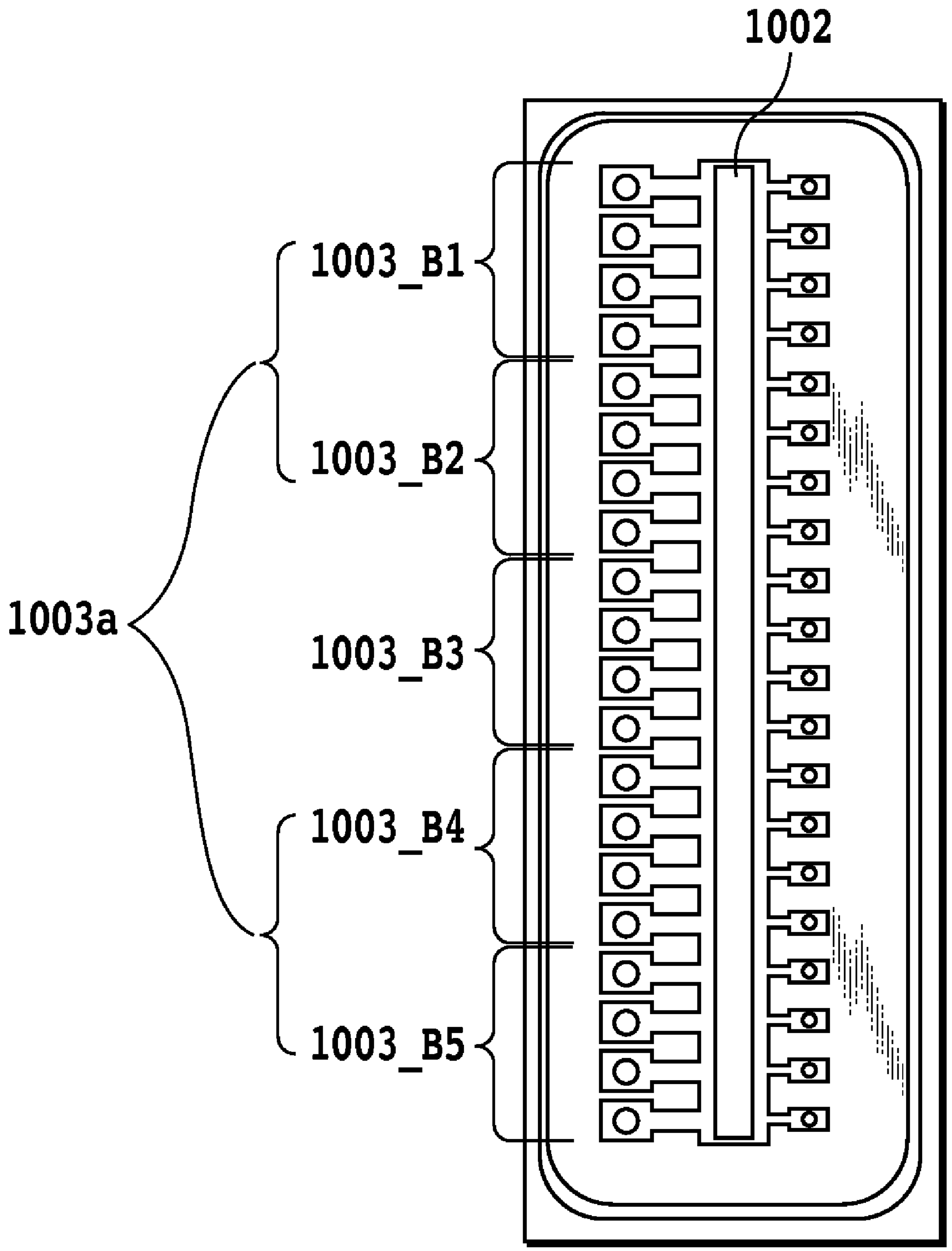
FIG. 13 is a diagram illustrating an electrothermal transducing element according to a second embodiment.

FIG. 13 is a diagram illustrating the electrothermal transducing elements according to the present embodiment. The present embodiment allows any of the plurality of electrothermal transducing elements 1003, provided in the printing element substrate, to be optionally selected by an area (1003_B1 to B5) in each line of the electrothermal transducing elements 1003 and to generate heat to bond the printing element substrate 1001 to the support member 711.

The electrothermal transducing elements are selected such that as shown in FIG. 12, an area 1003*b* in a central portion of the printing element substrate is selected and driven for bonding without driving electrothermal transducing elements 1003*a* installed on the opposite sides of the printing element substrate 1001 close to the electrode terminals 1005. That is, in FIG. 13, the adhesive 1201 is temporarily hardened by selecting and driving only the electrothermal transducing elements 1003*b* (1003_B3) without driving the electrothermal transducing elements 1003*a* (1003_B1, 1003_B2, 1003_B4, 1003_B5).

The present embodiment uses the printing element substrate 1001 having the 192 electrothermal transducing elements 1003 arranged in each line. The 80 to 111 electrothermal transducing elements 1003_B3 are used to heat the printing element substrate 1001.

Figure 14:
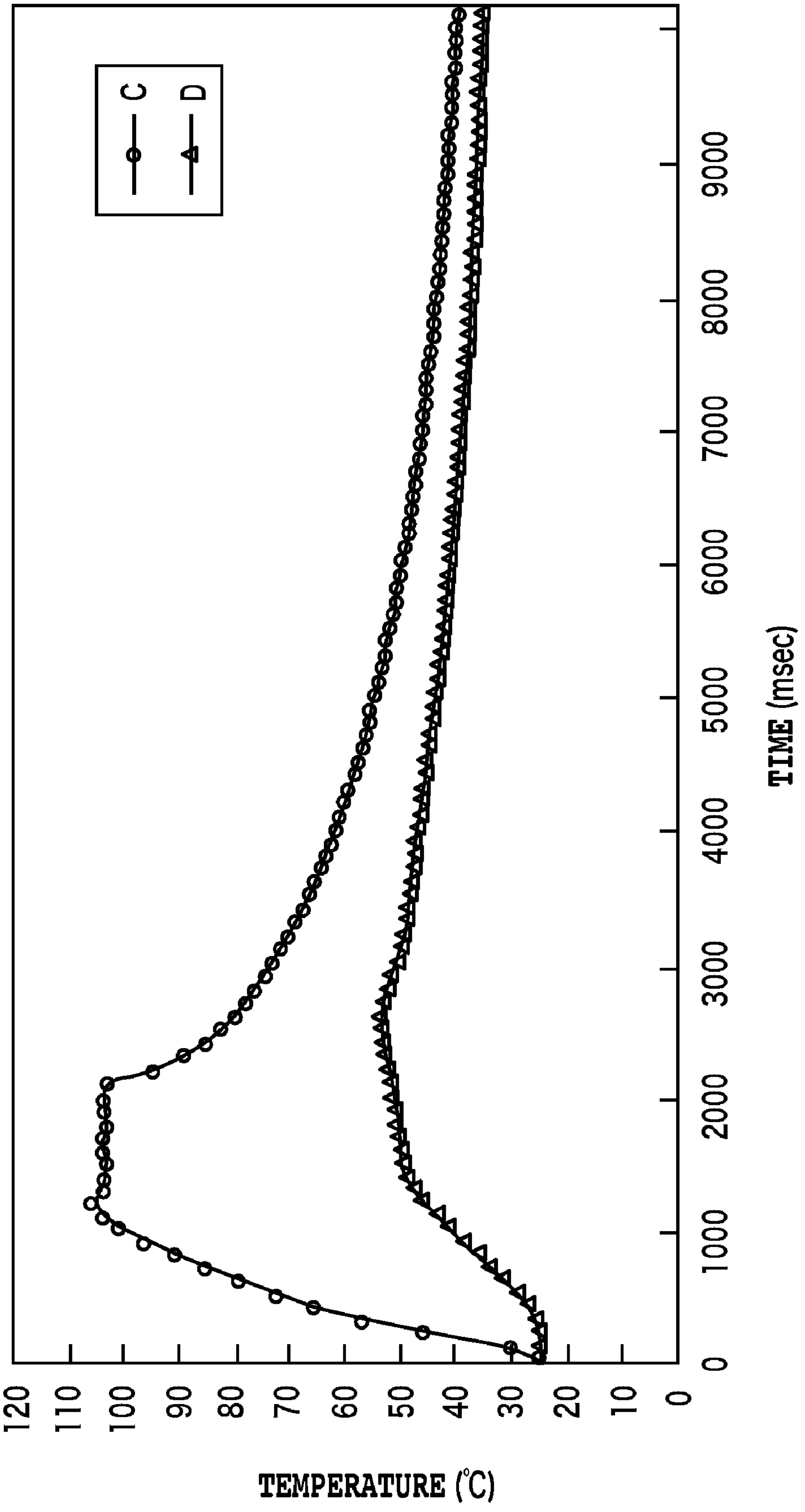
FIG. 14 is a diagram showing the temperature of a back surface of a printing element substrate and the temperature of a back surface of an electric wiring substrate in the vicinity of flying leads, in connection with a control method according to the second embodiment.
Figure 15A:
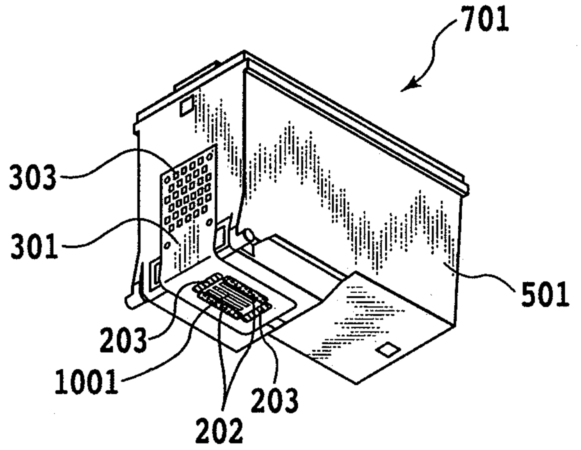
FIG.15A PRIOR ART
FIG. 15A is a perspective view of a conventional common color ink jet print head clearly showing a bottom surface portion thereof.
Figure 15B:
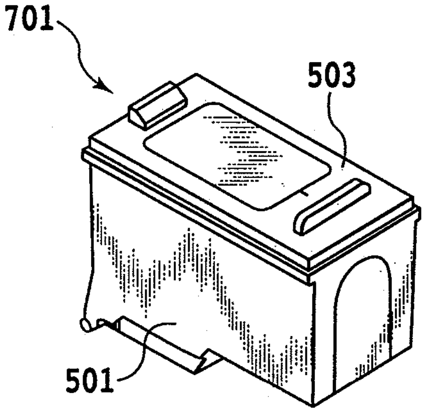
FIG.15B PRIOR ART
FIG. 15B is a perspective view of the conventional common color ink jet print head clearly showing a top surface portion thereof.
Figure 16:
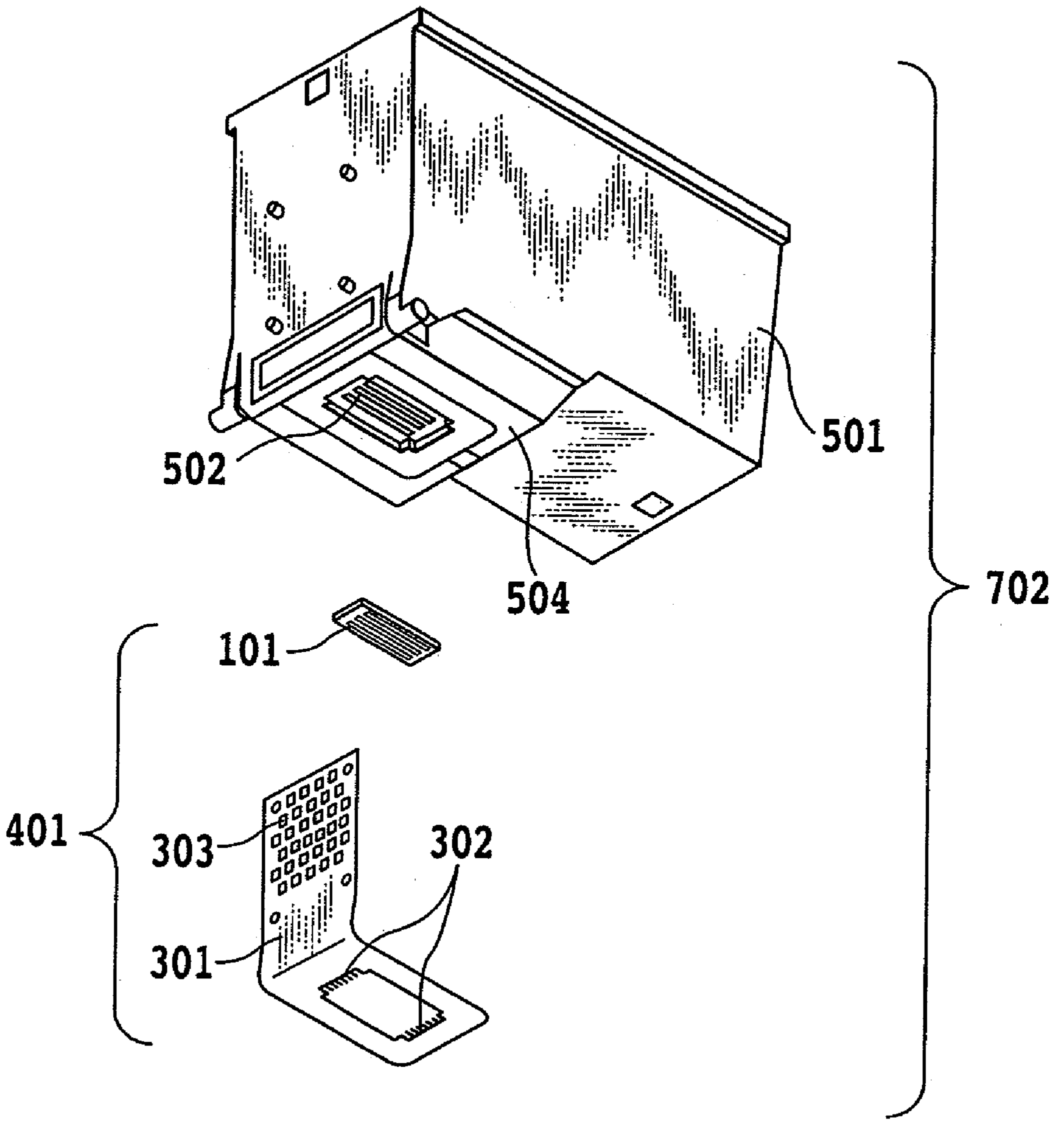
FIG.16 PRIOR ART
FIG. 16 is an exploded perspective view clearly showing the configuration of the conventional ink jet print head.
Figure 17:
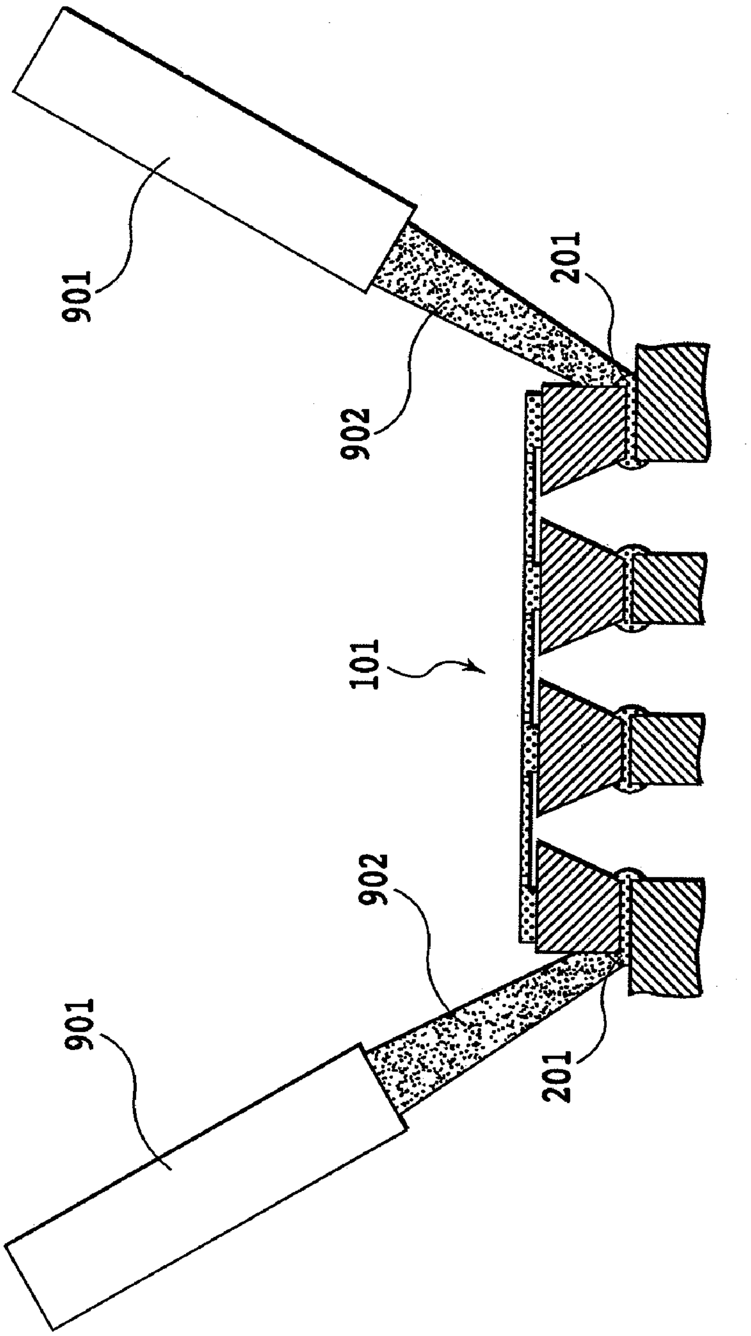
FIG.17 PRIOR ART
FIG. 17 is a diagram showing a method of hardening an adhesive, which method is described in Japanese Patent Laid-Open No. 2002-154209.

FIG. 14 is a diagram showing the temperature of the back surface of the printing element substrate 1001 and the temperature of the back surface of the electric wiring board 715 in the vicinity of the flying leads 714, in connection with the control method according to the present embodiment. A line C shows the temperature of the back surface of the printing element substrate in the area 1003*b*. A line D shows the temperature of the back surface of the electric wiring board in the vicinity of flying leads 302. A peak temperature on the line D is about 50° C., indicating that the temporary hardening conditions for the adhesive 1201, that is, 100° C. and 1 sec, fail to be met in this case. This in turn indicates that hardening of the adhesive 1201 in the vicinity of the flying leads 302 is not promoted.

The control according to the present embodiment prevents the thermal energy generated to temporarily harden the adhesive 1201 from promoting hardening of the adhesive coated on the bottom surface of the electric wiring board 715*a*. The control thus enables the temporary hardening of the adhesive bonding the printing element substrate 1001 and the support member 711 together.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-258870, filed Oct. 2, 2007, which is hereby incorporated by reference herein in its entirety.

What is claimed is:

1. A method of manufacturing an ink jet print head, which method comprises a step of fixing a printing element substrate comprising an electrothermal transducing element to a support member using an adhesive, the method further comprising:

a step of driving the electrothermal transducing element to heat the printing element substrate to temporarily harden the adhesive.

2. The method of manufacturing the ink jet print head according to claim 1, wherein a plurality of the electrothermal transducing elements are provided in the printing element substrate, and the temporary hardening step includes a step of selectively driving the electrothermal transducing elements to heat the printing element substrate to temporarily harden the adhesive.

3. The method of manufacturing the ink jet print head according to claim 2, wherein the electrothermal transducing elements are provided in the printing element substrate in lines, and in the temporary hardening step, the electrothermal transducing elements are driven on a line basis.

4. The method of manufacturing the ink jet print head according to claim 3, wherein in the temporary hardening step, the electrothermal transducing elements in each of the lines are selectively driven.

5. The method of manufacturing the ink jet print head according to claim 4, wherein in the temporary hardening step, the electrothermal transducing elements arranged in a central portion of the line are driven.

6. The method of manufacturing the ink jet print head according to claim 4, wherein in the temporary hardening step, the electrothermal transducing elements arranged in an outermost portion of the printing element substrate are driven.

7. The method of manufacturing the ink jet print head according to claim 1, further comprising a measurement step of measuring a temperature of the printing element substrate, wherein in the temporary hardening step, driving of the electrothermal transducing elements is controlled on the basis of a measurement result of the measurement step.

8. The method of manufacturing the ink jet print head according to claim 7, wherein measurement of the temperature of the printing element substrate comprises measurement of the temperature at least two points corresponding to different measurement timings.

9. The method of manufacturing the ink jet print head according to claim 7, wherein in the temporary hardening step, driving of the electrothermal transducing elements enables control of at least one of voltage, pulse width, and period of an electric signal supplied to the electrothermal transducing elements.

* * * * *